United States Patent [19]

Kajihara

[11] Patent Number: 4,713,096
[45] Date of Patent: Dec. 15, 1987

[54] APPARATUS FOR SEPARATING GRANULAR SOLIDS FROM CARRYING GAS

[75] Inventor: Isamu Kajihara, Yokosuka, Japan
[73] Assignee: Morinaga & Co., Ltd., Tokyo, Japan
[21] Appl. No.: 861,182
[22] Filed: May 9, 1986
[51] Int. Cl.[4] .............................................. B01D 53/24
[52] U.S. Cl. ...................................... 55/204; 209/148; 55/459 R
[58] Field of Search ....................... 55/96, 204, 459 R; 209/144, 148

[56] References Cited

U.S. PATENT DOCUMENTS

| 3,391,787 | 7/1968 | Salomon | 55/459 R X |
| 4,296,864 | 10/1981 | Misaka et al. | 209/144 |
| 4,551,241 | 11/1985 | Saverse et al. | 209/148 |

FOREIGN PATENT DOCUMENTS 0094098 11/1983 European Pat. Off. .......... 55/459 R

Primary Examiner—Charles Hart
Attorney, Agent, or Firm—Armstrong, Nikaido, Marmelstein & Kubovcik

[57] ABSTRACT

An apparatus for separating granular solids from the carrying gas thereof by the use of a swirl stream of a mixture gas in a certain chamber, characterized in that: in addition to said mixture gas to be separated in its treatment, another gas is separately injected into said chamber from its wall surface so as to be brought into contact with said swirl stream of said mixture gas in said chamber so that said granular solids are prevented from adhering to an inner wall surface of said chamber while once adhered granular solids are immediately scaled off.

4 Claims, 2 Drawing Figures

APPARATUS FOR SEPARATING GRANULAR SOLIDS FROM CARRYING GAS

BACKGROUND OF THE INVENTION

1. Field of the Invention

The present invention relates to an apparatus for separating granular solids such as powder and the like from the carrying gas thereof to obtain such solids.

2. Description of the Prior Art

Hitherto, as is well known in a conventional method for separating/obtaining the granular solids from the carrying gas, the gas such as air carrying the granular solids to be separated, i.e., a mixture gas is fed at a high speed into certain chamber in which the mixture gas is swirled at a high speed, while subjected to gravity and centrifugal actions, to be separated into the granular solids and carrying gas which are separately taken out of the chamber.

In carrying out such conventional method, an apparatus for separating the mixture gas into the granular solids and carrying gas, that is a cyclone has been employed. However, these conventional method and apparatus are not adequate for treating highly adhesive granular solids because such highly adhesive solids easily adhere to an inner wall surface of the cyclone in action to build bridges thereof, the build-up of which bridges eventually causes clogging of the cyclone in a relatively short operation-time to make it substantially impossible to employ the conventional method and apparatus in treating such highly adhesive granular solids.

SUMMARY OF THE INVENTION

It is an object of the present invention to provide an apparatus for separating granular solids from the carrying gas thereof by the use of a swirl stream of a mixture gas carrying the solids in a certain chamber in which the mixture gas has been fed, characterized in that: in addition to the mixture gas to be separated in its treatment, another gas is separately injected into the chamber from its wall surface so as to be brought into contact with the swirl stream of the mixture gas in the chamber so that the granular solids are prevented from adhering to an inner wall surface of the chamber while once adhered granular solids are immediately scaled off.

The above-mentioned another gas is one having another object quite different from that of the mixture gas to be treated, and therefore it is not an object of treatment so that this kind of another gas may be the same kind as that of the mixture gas or a different kind of gas.

It is preferable to introduce such another gas into the chamber over a wide range of the chamber wall with the widest possible range.

The another gas may be injected in any manner into the chamber unless it disturbs the separating treatment of the mixture gas.

This another gas is so determined that a flowing speed of such gas injected from a first chamber's wall surface into the chamber is larger than a precipitation speed of the granular solids to be separated/obtained in consideration of other conditions. In case that a small amount of deposition of the solids is permitted, the pressure of the another gas in the second chamber 4 is determined to be a higher static pressure than that required to break such deposition of the solids.

It is another object of the present invention to provide a separating apparatus having a novel construction for carrying out the above method of the present invention, which apparatus comprises:

a first chamber constructed of a permeable wall;

a casing spaced apart from the first chamber by a certain distance and encircling the same to form a second chamber therebetween;

a gas inlet provided in the first chamber, for feeding a mixture gas to be subjected to a separating treatment into the first chamber;

a gas outlet provided in an upper portion of the first chamber;

a separated granular solid outlet provided in a lower portion of the first chamber; and a gas feeding opening provided in the casing, for introducing into the second chamber another gas different from the mixture gas carrying the granular solids.

It is convenient to slightly project a front end of the gas outlet into the first chamber, because unseparated granular solids are prevented from being discharged together with the treated gas.

The permeable wall of the first chamber may be made of porous materials such a synthetic resins and ceramics, or may be constructed of materials such as one having been treated to be permeable, or may be made of metal or synthetic resins having been punched, or may be made of metal or synthetic resins having a net-like construction.

It is preferable to cover the first chamber with the casing as wide as possible, and more particularly to cover at least the entire side surface of the first chamber with the casing to form the second chamber.

The second chamber is so constucted that the another gas is evenly fed to the first chamber over the substantially overall area of the permeable wall of the first chamber, so that the second chamber is not specifically restricted in its volume.

DESCRIPTION OF THE PREFERRED EMBODIMENT

The present invention will be hereinbelow described with reference to the drawings.

Figure 1:
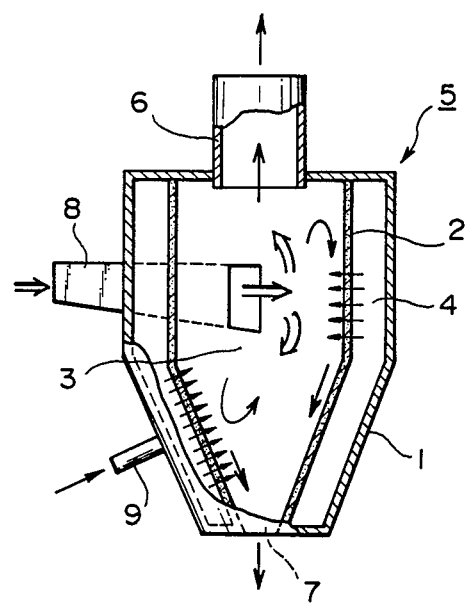
FIG. 1 is a central longitudinal sectional view of an embodiment of a separating apparatus of the present invention.
Figure 2:
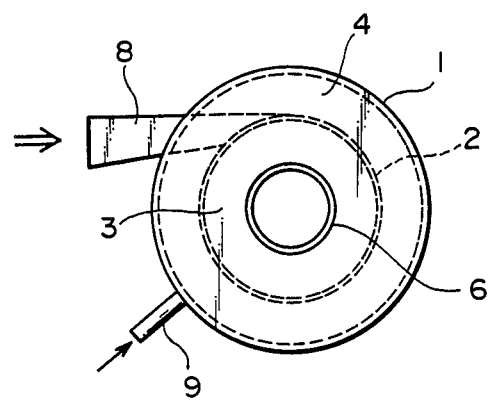
FIG. 2 is a plan view of the separating apparatus shown in FIG. 1.

In FIG. 1, the reference numeral 1 denotes a casing; and 2 a wall surface defining a first chamber. Thus, in a separating apparatus 5, a second chamber 4 is defined by the casing 1 and the wall surface 2 of the first chamber 3. Each of the first chamber 3 and the second chamber 4 is shaped into a cylindrical form in its upper portion and into a frustconical form in its lower portion. Although the second chamber 4 is formed along the entire side surface of the first chamber 3, it is not formed in a ceiling portion of the apparatus 5. In a central portion of a ceiling portion of the first chamber 3 is provided a gas outlet 6 in a manner that its front end projects into the first chamber 3 by a certain length. Although it is not necessarily required to project the front end of the gas outlet 6, in case that such front end is projected, it is possible to prevent relatively large ones of the particles from being discharged from the gas outlet 6, which relatively large solids first suspended in an upward swirl stream of the mixture gas fed into the first chamber 3 reach the ceiling surface of the first chamber 3 to hit the same and lose their kinetic energy so that they drop downwards in the first chamber 3. In such case, a projecting length of the front end of the gas outlet 6 is preferably approximately 10% of a diameter of a ceiling portion of the first chamber 3. In case that such length is too short, its effect is not expected. On the other hand, in case that it is too long, such separation apparatus has the substantially same construction as that of a conventional cyclone in which a lower end of an inner sleeve corresponding to the gas outlet 6 reaches a position below a lower surface of a mixture gas inlet thereof, so that a sufficient effect is not also expected.

In a lower central portion of the separating apparatus 5, i.e., in a lower central portion of the first chamber 3 is provided a granular solid outlet 7 shaped into a form which is obtained by cutting a cone by a plane positioned apart from an ideal peak of a conical from of the first chamber 3.

A mixture gas inlet 8 for feeding the mixture gas to be treated into the first chamber 3 is provided in a side wall of the first chamber 3 at a position slightly below its ceiling surface to open into the first chamber 3, which inlet 8 passes through the second chamber 4. A distance between the ceiling surface of the first chamber 3 and the mixture gas inlet 8 is so determined that the upward swirl stream of the mixture gas introduced into the first chamber 3 sufficiently can make at least one revolution between the ceiling surface and the mixture gas inlet 8. Further, such mixture inlet 8 is substantially tangentially directed to the side wall of the first chamber 3 so that the mixture gas is tangentially fed into the first chamber 3. As described above, it is preferably that the mixture gas inlet 8 is provided in a position below the ceiling surface of the first chamber 3 by a certain distance and above a conical portion of the first chamber 3.

The reason why the mixture gas inlet 8 is provided in such a lower position is that it is necessary to prevent the granular solids of the mixture gas from being adhered to the ceiling surface of the first chamber 3 against the action of the upward swirl stream of the mixture gas introduced into the first chamber 3 from the inlet 8. Namely, since there is not the second chamber 4 in the ceiling portion of the first chamber 3, in case that the mixture gas inlet 8 is provided in a position near the ceiling portion of the first chamber 3, the upward swirl stream of the mixture gas introduced into the first chamber 3 directly hits the ceiling surface of the first chamber 3 and will cause adhesion of the granular solids to the ceiling surface. However, in case that the mixture gas inlet 8 is provided in a position permitting one revolution of the upward swirl stream of the mixture gas below the ceiling surface, such upward swirl stream does not almost hit the ceiling surface strongly to lose its energy and to become a downward stream, so that the granular solids almost does not adhere to the ceiling surface of the first chamber 3. As will be described later, by providing the mixture gas inlet 8 in such a lower position in the first chamber 3 and slightly projecting the front end of the gas outlet 6 into the first chamber 3, it is possible to prevent the granular solids from being discharged with a carrying gas through the gas outlet 6, so that a separating/obtaining efficiency of the granular solids is improved according to the present invention.

In case that the second chamber 4 also covers the ceiling surface of the first chamber 3, since the another gas may be injected into the first chamber 3 from the ceiling surface to prevent the granular solids from adhering to the ceiling portion of the first chamber 3 or to remove the deposition of the granular solids on the ceiling portion therefrom, it is not necessary to considerably lower a position in which the mixture gas inlet 8 is provided below the ceiling surface of the first chamber 3.

The reference numeral 9 denotes a gas inlet for feeding another gas different from the mixture gas, into the second chamber 4, which gas inlet 9 is provided in the casing 1 for feeding a certain amount of gas and may be mounted on any portion of the casing 1 defining the second chamber 4.

As described in the above, such another gas is one quite different from the mixture gas to be treated in a separating manner, and air may be employed ordinarily.

In this embodiment of the present invention, a cylindrical/conical separating apparatus is employed, an overall height of which apparatus is 2850 mm; an inner diameter of the first chamber 3 thereof is 700 mm; an overall diameter of which separating apparatus is 850 mm; a distance between an upper end of the mixture gas inlet 8 and the ceiling surface of the first chamber 3 is 950 mm; and the side wall of the first chamber 3 thereof is constructed of three layers of stainless steel Dutchwave wire cloth.

By the use of the above apparatus in a cocoa production line, a cocoa powder a temperature of which is about 60° C. having been carried by the air is separated from its carrying air.

A mixture gas consisting of cocoa powder and air is fed at a velocity of 15 m/sec from the mixture gas inlet 8. The thus fed mixture gas formes a swirl stream along an inner wall surface of the first chamber 3 therein, so that the particles having a large specific gravity are moved radially outwardly to the wall surface of the first chamber 3 while the carrying air of the mixture gas is moved radially inwardly to the center of the first chamber 3 so that they are separated from each other. An amount of gas to be fed from the another gas inlet 9 is 600 m$^3$/hr.

Although a part of the particles in the mixture gas is moved upwards by the upward swirl stream of the gas against the gravity, such part is eventually moved downwards by gravity before such part reaches the ceiling surface of the first chamber 3.

The particles in the mixture gas are moved to the wall surface of the first chamber 3 under the influence of the centrifugal force produced in the swirl stream of the mixture gas in the first chamber 3. Such centrifugal force acting on the particles is decreased by the gas injected from the inner wall surface of the first chamber 3, so that the solids are then moved downwards by gravity and discharged from the outlet 6 after their passing through the first chamber 3.

Thus, the separating apparatus is continuously operated for 5 days in which the apparatus works 13 hours per day provided that cocoa powder is treated at a rate of 600 Kg/hr without stopage of its work for cleaning and the like of the apparatus. As a result, a separating-/obtaining efficiency of cocoa is in the range of from 98.0 to 99.4%/day, on the average, while such efficiency at the end of the work substantially does not change relative to that at the beginning of the work.

Consequently, according to the method and the apparatus for separating/obtaining the granular solids of the present invention, it is possible to substantially completely prevent the granular solids from adhering to the inside of the separating apparatus even if such granular solids are highly adhesive ones the treatment of which is hitherto substantially impossible, to make it possible to separate/obtain such solids with an excellent separating/obtaining efficiency thereof, while it is also possible to run the apparatus for a long time even when it works in a condition a temperature of which is above the melting point of fat which the granular solids to be separated from the mixture gas contain.

What is claimed is:

1. In a cyclone separator for separating granular solids from a carrying gas thereof, having a cylindrical main body provided with a downwardly gradually reducing-diameter lower portion; mixture gas inlet for introducing a mixture gas consisting of granular solids and a carrying gas thereof into said main body, said mixture gas inlet being tangentially directed to a side wall of said main body; a gas outlet for discharging said carrying gas having been separated from said granular solids, said gas outlet being provided in an upper portion of said main body; and a granular solid outlet for discharging said granular solids having been separated from said carrying gas thereof, the improvement wherein a front end of said gas outlet is slightly projected into said main body; and said mixture gas inlet is provided in a side wall of said main body at a position spaced downward apart from a ceiling portion of said main body by a distance enabling said mixture gas to make at least one swirl above said mixture gas inlet when introduced into said main body.

2. The cyclone separator according to claim 1, wherein said main body is constructed of a porous and air-permeable wall, and covered with a casing provided with a gas inlet for feeding another gas different from said mixture gas so that a predetermined space is formed between said main body and said casing, and so that said another gas may be fed into said space and then injected into said main body through said air-permeable wall of said main body.

3. The cyclone separator according to claim 1 wherein a projection length of the front end of the gas outlet is 10% of a diameter of a ceiling portion of the main body.

4. The cyclone separator according to claim 2 wherein a projection length of the front end of the gas outlet is 10% of a diameter of a ceiling portion of the main body.

* * * * *